(12) United States Patent
Adams et al.

(10) Patent No.: US 12,393,558 B2
(45) Date of Patent: Aug. 19, 2025

(54) INTERFACE FOR CLUSTER API MONITORING AND SYSTEMS AND METHODS FOR THE SAME

(71) Applicant: T-Mobile USA, Inc., Bellevue, WA (US)

(72) Inventors: Scott Clifford Adams, Colorado Springs, CO (US); Detrich Utti, Houston, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/677,657

(22) Filed: May 29, 2024

(65) Prior Publication Data

US 2025/0077479 A1 Mar. 6, 2025

Related U.S. Application Data

(60) Provisional application No. 63/535,722, filed on Aug. 31, 2023.

(51) Int. Cl.
*G06F 16/00* (2019.01)
*G06F 16/21* (2019.01)
*G06F 16/28* (2019.01)

(52) U.S. Cl.
CPC .......... *G06F 16/211* (2019.01); *G06F 16/285* (2019.01)

(58) Field of Classification Search
CPC ......... G06F 16/24532; G06F 16/24522; G06F 16/288; G06F 9/522; G06F 9/547; G06F 9/5072; G06F 9/5077; G06F 16/256; G06F 16/254; G06F 16/245; G06F 11/30; G06F 9/5055; G06F 8/71; G06F 8/65; H04L 67/1001; H04L 67/51; H04L 67/1014; H04L 69/40; H04L 67/148; H04L 43/08; G06Q 30/0206; G06Q 10/06315; G06Q 10/06311
See application file for complete search history.

(56) References Cited

U.S. PATENT DOCUMENTS

| | | | |
|---|---|---|---|
| 7,886,305 | B2 | 2/2011 | Ahmed et al. |
| 9,753,744 | B1 | 9/2017 | Wells et al. |
| 9,785,476 | B2 | 10/2017 | Wagner et al. |
| 9,804,886 | B1 | 10/2017 | Wells et al. |
| 9,930,103 | B2 | 3/2018 | Thompson |
| 10,387,223 | B2 | 8/2019 | Nadig et al. |
| 10,585,683 | B2 | 3/2020 | Wells et al. |
| 11,435,983 | B2 | 9/2022 | Burman et al. |
| 11,909,604 | B2 | 2/2024 | Degioanni |
| 2024/0028412 | A1* | 1/2024 | Xu .................. G06F 9/5077 |
| 2024/0028590 | A1* | 1/2024 | Richter ............ G06F 16/24532 |
| 2024/0428279 | A1* | 12/2024 | Sahoo ................ G06F 16/256 |

* cited by examiner

*Primary Examiner* — Yicun Wu
(74) *Attorney, Agent, or Firm* — Perkins Coie LLP

(57) ABSTRACT

Systems and methods for dynamic monitoring of Kubernetes clusters based on associated API interfaces are disclosed herein. The system can receive a query for a dynamic stream of data. The system can generate a first schema. The system can transmit an API request for a dynamic stream of real-time data. The system can receive a dataset associated with the cluster. The system can generate a second dataset. The system can extract a first data stream associated with the first cluster. The system can transmit the first data stream to the client device.

20 Claims, 4 Drawing Sheets

INTERFACE FOR CLUSTER API MONITORING AND SYSTEMS AND METHODS FOR THE SAME

CROSS-REFERENCE TO RELATED APPLICATIONS

This application claims priority to U.S. Provisional Patent Application No. 63/535,722 entitled "KUBERNETES-SPECIFIC INTERFACE FOR CLUSTER API MONITORING AND SYSTEMS AND METHODS FOR THE SAME" and filed Aug. 31, 2023. The content of the foregoing application is incorporated herein by reference in its entirety.

BACKGROUND

Kubernetes is an example of an open-source container orchestration system for automating software deployment, scaling, and management. Kubernetes defines a set of building blocks ("primitives") that collectively provide mechanisms that deploy, maintain, and scale applications based on central processing unit (CPU), memory, or custom metrics. Kubernetes is loosely coupled and extensible to meet the needs of different workloads. The internal components as well as extensions and containers that run on Kubernetes rely on the Kubernetes application programming interface (API). The platform exerts its control over compute and storage resources by defining resources as objects, which can then be managed as such.

Kubernetes follows the primary/replica architecture. The components of Kubernetes can be divided into those that manage an individual node and those that are part of the control plane. The Kubernetes master node handles the Kubernetes control plane of the cluster, managing its workload and directing communication across the system. The Kubernetes control plane includes various components, each with its own process, that can run both on a single master node or on multiple masters supporting high-availability clusters.

BRIEF DESCRIPTION OF THE DRAWINGS

Detailed descriptions of implementations of the present invention will be described and explained through the use of the accompanying drawings.

Figure 1:
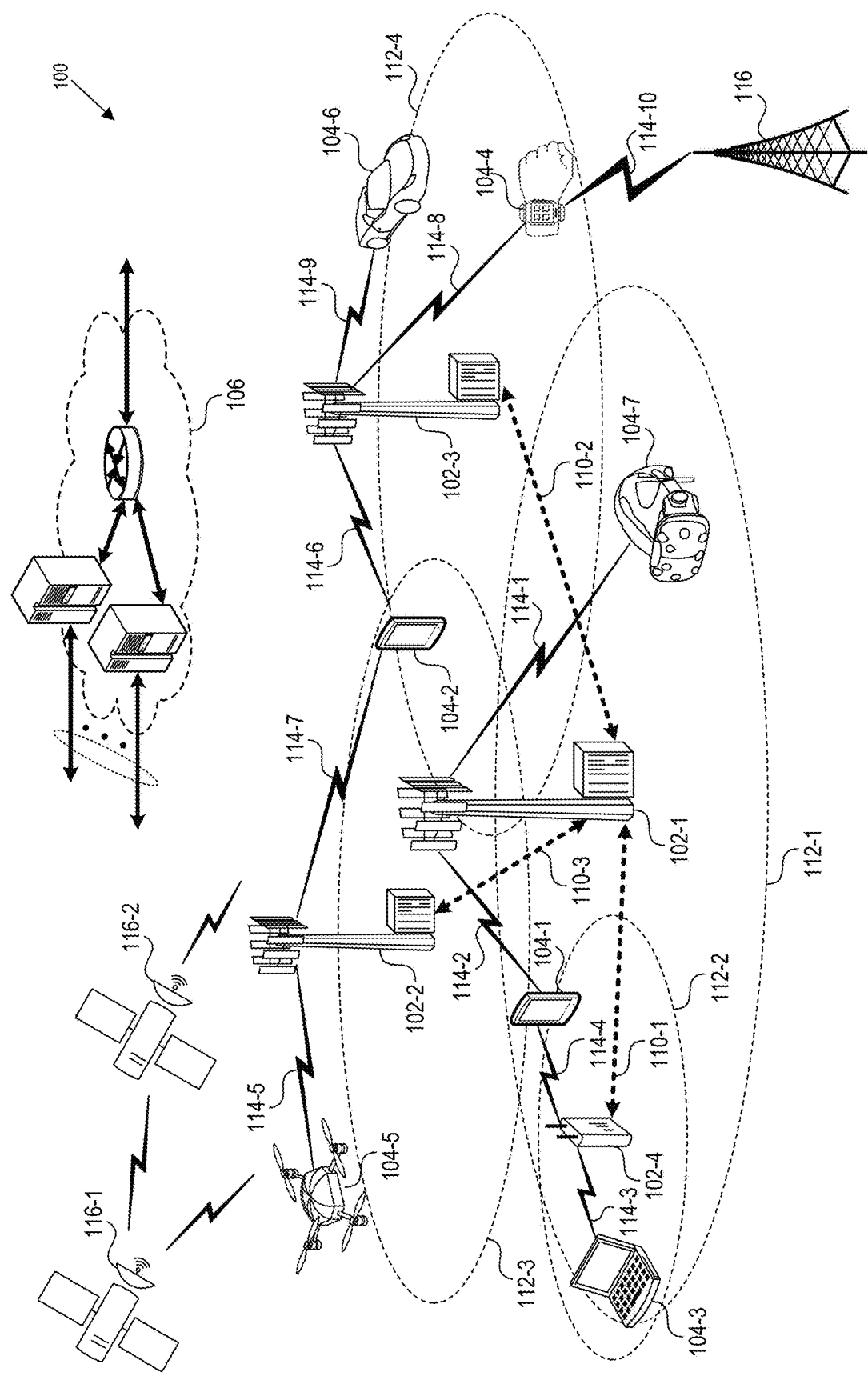
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The systems and methods disclosed herein enable monitoring clusters of computer devices with different attributes, such as differing application programming interfaces (API) specifications, for compilation and transmission to client devices. In one example, an operator agent generates cluster interfaces for each Kubernetes cluster to be monitored or queried. Each cluster interface can determine a schema for conversion of the associated cluster API format to a predetermined format, such that the system can account for variations in information provided by the API across the various clusters in response to a query. By doing so, the system can dynamically convert Kubernetes API specifications to a second format (e.g., a GraphQL schema) for efficient transmission to the client devices.

As an illustrative example, the system handles client-side queries relating to the names and statuses of Kubernetes clusters linked to the system. For example, the system can receive, at an ingress interface, a query for a dynamically updated list of objects associated with each Kubernetes cluster within the system. In response to the query, the system (e.g., through an operator agent) can generate or update a set of cluster interfaces. Each cluster interface can include a schema for monitoring an associated Kubernetes cluster associated with the system. For example, the cluster interface includes an interface for a watch function for a given cluster's API that enables dynamic monitoring of the cluster for a list of associated objects. The cluster interface can broadcast this real-time data to the ingress interface for exposure to the client devices. By doing so, the system enables client devices to receive live broadcasts of compiled information relating to a variety of Kubernetes clusters, without knowledge of or communication with each cluster's API.

Preexisting systems that are communicably linked to multiple Kubernetes clusters with different API specifications require each client device to independently track and query each relevant Kubernetes cluster, as well as its associated API specification. Because each cluster accessible to the client device may include different software versions or API specifications, a client device associated with a preexisting system may require cluster-specific information relating to software versions, API calls, endpoint addresses, query formats, and API specifications. For example, in such preexisting systems, a client device must query each relevant Kubernetes cluster for which information is requested based on stored metadata, where the stored metadata includes information specific to the API specification associated with each queried cluster. As such, preexisting systems struggle with scalability, as a client device must store further information for each additional cluster that is linked to the system. Furthermore, in such systems, client devices receive all information received from the API without preprocessing or filtering, even where only data associated with a subset of the API specification is requested. As such, communication links between client devices and each Kubernetes cluster handle considerably more information than requested by the client devices, leading to scalability and bandwidth issues.

The systems and methods disclosed herein enable a client device to receive information associated with multiple clusters based on a single query. The system stores and receives information associated with each cluster, such as associated schema for parsing of information received from the cluster's API. These cluster-specific schema enable processing and transmission of this information to a format accessible to the client devices through an ingress interface. For example, the client device does not need to store cluster-specific information for each cluster for which data is sought. The system can dynamically update these schemas according to detected changes in API specifications associated with given Kubernetes clusters. Thus, in response to a query from a client device, the system can transmit filtered information relating to the query, where information irrelevant to the client device's query is removed from the transmission. As such, the system improves scalability of client-side queries of multiple Kubernetes clusters by reducing the information transmitted to the client devices.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other either directly or indirectly (e.g., through the core network 106) or over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions, while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Cluster Monitoring System

Figure 2:
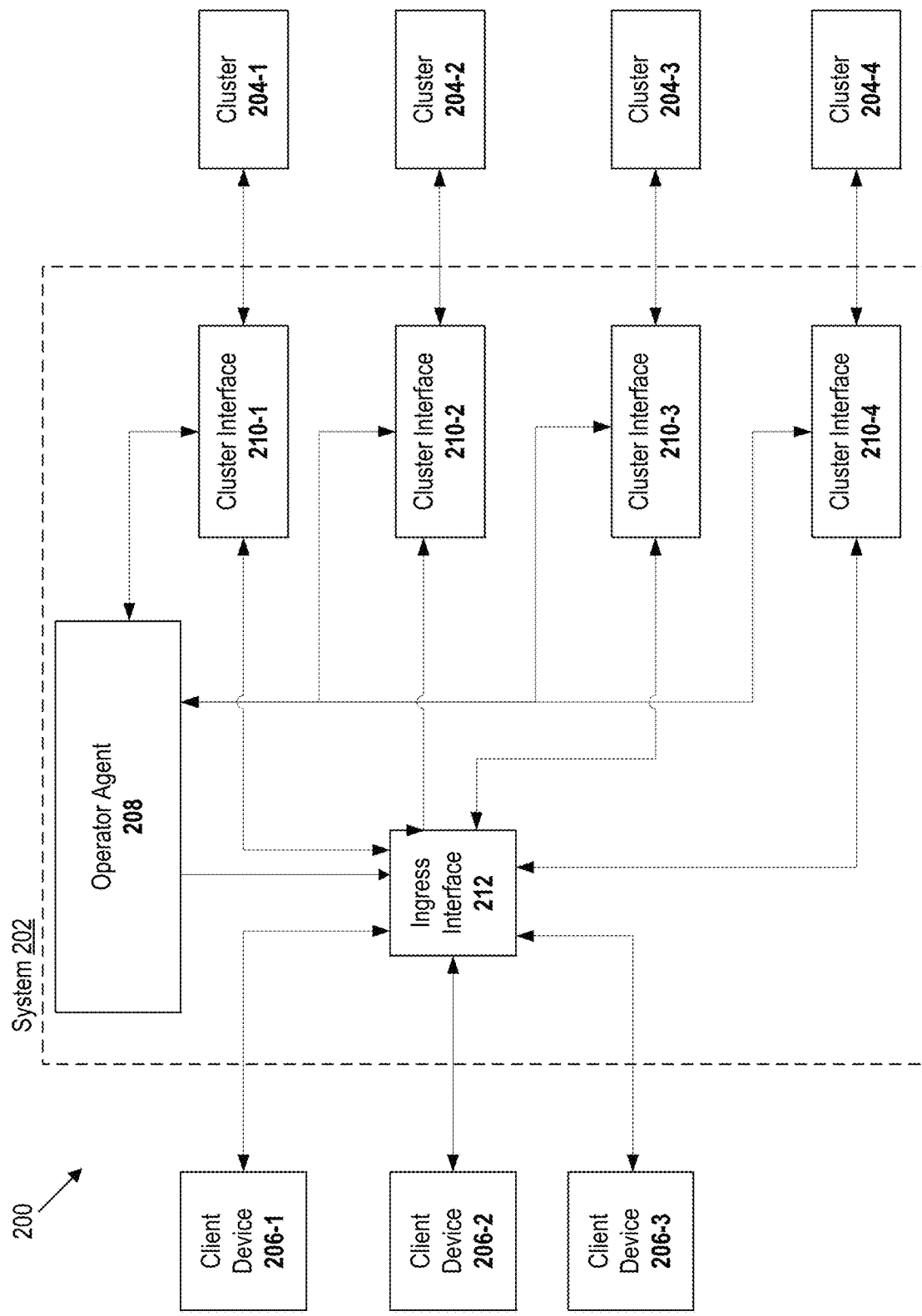
FIG. 2 is a schematic illustrating a system for monitoring Kubernetes clusters with disparate application programming interface (API) specifications using cluster-specific schema.

FIG. 2 is a schematic 200 including a system 202 for monitoring Kubernetes clusters 204-1 through 204-4 (collectively referred to as "clusters 204") with disparate API specifications using cluster-specific schemas. For example, the cluster monitoring system enables dynamic monitoring of various Kubernetes clusters 204 through the generation of schemas that enable conversion of dynamically received cluster data to a uniform format, for further transmission to the client devices 206-1 through 206-3 (collectively referred to as "client devices 206"). The cluster monitoring system can include an ingress interface 212 and an operator agent 208. The cluster monitoring system can interface with one or more clusters (e.g., Kubernetes clusters) through associated cluster interfaces 210-1 through 210-4 (collectively referred to as "cluster interfaces 210").

A cluster, such as cluster 204-1, can include any grouping, combination, or organization of nodes (e.g., a connection point, such as a router, a server, a virtual machine, or another computing device). For example, a cluster can include a group of virtual machines, computing devices and/or servers. In some implementations, nodes within a cluster communicate using local area networks, with each node running its own instance of an operating system. For example, nodes within a cluster exhibit similar hardware, operating systems and/or software, and/or are provisioned for the same purpose or within a similar architecture. For example, the cluster can run containerized applications, as in a Kubernetes-type container orchestration system. For example, a Kubernetes system can include subgroups of nodes, such as a control plane node group and/or a worker node group. Nodes within the cluster can be within the cloud and/or managed or provisioned by a cloud provider. Additionally, nodes can be managed or provisioned by any hardware provisioning system, such as "on-prem" systems, which can include virtual machines that act as nodes. Nodes within such subgroups can have different purposes. By modularizing computations using nodes, clusters enable complex operations, such as processing of workloads, in scalable systems. For example, such clusters enable Kubernetes-type container orchestration, as well as high-performance distributed computing, for improvements in efficiency and scalability of processing tasks.

A cluster can include an associated API. An API can include an interface for communication between different applications, computer programs, or computer systems. For example, an API can include a specification (e.g., a schema)

that defines a standard on how to build, use or communicate with an API. For example, an API can include subroutines, methods, requests, or endpoints with which another program may interact or call. The API specification can define such calls, thereby setting how these calls are implemented or used. For example, a given Kubernetes cluster includes an API specification specific to the features, objects, attributes, extensions, or elements associated with the cluster. As an illustrative example, an API specification defines or describes information associated with a database extension (e.g., an SQL extension) associated with a given Kubernetes node.

An API associated with a cluster can be associated with a style, standard, or type, including stateful or stateless APIs. In one example, a Kubernetes cluster-specific API is based on a representational state transfer (REST) architectural style. A RESTful API includes guiding constraints indicating its client-server architecture, statelessness, cacheability, layered nature, and uniform interface. For example, a Kubernetes-based REST API enables a user, system, or application to query or manipulate the state of API objects, such as pods, namespaces, configuration maps, or events. As an illustrative example, APIs can include watches that enable dynamic monitoring of objects and events associated with a given cluster. Kubernetes clusters can have differing API specifications depending on the features, extensions, or attributes associated with a given cluster. As such, API calls and API endpoints can differ (e.g., be disparate) between Kubernetes clusters associated with the cluster monitoring system. For example, API specifications can include disparate or incomparable elements, such as differing data structures, call formats or syntax. As such, the cluster monitoring system can handle (e.g., receive and transform information) relating to different clusters with disparate API specifications.

The cluster monitoring system 202 can generate (e.g., through the operator agent 208) cluster interfaces 210 for monitoring, interacting with, or retrieving information from associated clusters. For example, the operator agent 208 can receive information indicating that a cluster has been created or linked to the cluster monitoring system. This information can include an endpoint (e.g., an address or a call associated with an API for the added cluster). Based on this endpoint, the operator agent 208 can generate or appoint a cluster interface (e.g., a cluster interface 210-4) configured to interact with (e.g., query or modify) the added cluster. Additionally or alternatively, the operator agent 208 detects or receives information relating to a removed cluster (e.g., a decommissioned cluster, or a cluster with which the cluster monitoring system has ceased to communicate). Based on receiving information relating to this removed cluster, the cluster monitoring system, through the operator agent 208, can terminate or generate an indication that an associated cluster interface is removed from operation or incapable of communication with the associated cluster.

A cluster interface can include an API capable of interacting with features of a cluster-specific API. For example, a cluster interface includes an API that can be modified, updated, or generated dynamically based on the API specification exposed by the associated Kubernetes cluster. The cluster interface can expose any or all types and operations from the Kubernetes API (e.g., a REST API) into a second format, such as a GraphQL-based API. The cluster interface can dynamically query the Kubernetes API for changes in the API specification. The cluster monitoring system can update the cluster interface (e.g., by updating an associated schema or specification) to maintain consistency with the API version of the given cluster when a change in the associated API specification is detected.

For example, the cluster interface includes a protocol (e.g., a translation layer) for converting information from a first format or schema to second format or schema. A schema (e.g., an API schema) can include metadata specifying the structure of data associated with APIs. For example, a schema includes a structure for converting information from an API associated with a cluster (e.g., a Kubernetes REST API) to a format or structure associated with another API (e.g., a GraphQL API). A schema can include mappings (e.g., a key-value pair) to enable filtering or extraction of certain information. The mappings can specify portions of datasets associated with particular types of data. For example, a mapping of a schema may specify that data streams associated with a cluster are within a particular field or portion of the associated dataset. As an illustrative example, the cluster interface includes a translation layer (e.g., a converter) for converting a dynamic stream of real-time data associated with a cluster from a Kubernetes-specific format (e.g., data associated with events captured with a Kubernetes API watch function) to another format (e.g., compatible with an API associated with the cluster interface). For example, this converted data can include a dynamic stream of real-time data of a second format, different from the first, Kubernetes-specific format. The cluster interface can dynamically update the protocol or translation layer based on changes in schema or specification (e.g., due to a change in a version of software associated with a given Kubernetes cluster). In some implementations, the schema includes a structure for converting other cluster-related data to a cluster interface-specific format. For example, data associated with static RESTful endpoints of the clusters is converted at the cluster interface and relayed to client devices (e.g., for data that does not require dynamic or continual monitoring).

The cluster monitoring system can interface with client devices 206. A client device includes, for example, a UE, a mobile device, a server device, a node, or a virtual machine capable of network connections. A client device can generate a query for information relating to clusters (e.g., Kubernetes clusters). For example, a client device 206-1 generates a query associated with one or more Kubernetes clusters associated with the cluster monitoring system. The query can request information relating to objects or other attributes of these clusters. In some implementations, a query received from a client device includes a request for dynamically updated lists of objects (e.g., resources, such as Kubernetes pods) associated with each Kubernetes cluster. For example, the query can include a request for periodic transmission of information relating to structured query language (SQL) databases associated with Kubernetes clusters. The query can include requests for lists of names (e.g., associated with clusters, pods, or nodes therein). In some implementations, the query includes a request for a list of Kubernetes deployments or pods in all or specific namespaces associated with one or more Kubernetes clusters. In some embodiments, the query can specify particular Kubernetes clusters, pods, or deployments about which information is requested (e.g., through endpoint identifiers). For example, the query can specify a request for a list of Kubernetes resources associated with a given label. By receiving client-generated queries, the cluster monitoring system can respond with query-specific information, where information irrelevant to the query is filtered out of the response. By doing so, the disclosed cluster monitoring system improves the bandwidth constraints associated with querying Kubernetes clusters.

The cluster monitoring system can communicate with client devices 206 through an ingress interface 212. An ingress interface can include one or more hardware or software components that enable exposure (e.g., communication) between a client device or associated application and the cluster monitoring system (e.g., including one or more clusters associated with the cluster monitoring system). For example, the ingress interface 212 includes network interfaces (e.g., wired or wireless) with client devices 206 and/or Kubernetes clusters 204. The ingress interface 212 can include high-bandwidth network connections (e.g., fiber optic links) to Kubernetes clusters to enable high-throughput API calls to such clusters. Additionally or alternatively, the ingress interface 212 includes wireless lower-bandwidth links with client devices for receipt and/or transmission of query-related information. Thus, in one example, the cluster monitoring system can effectively process large amounts of information from the Kubernetes clusters 204 over high-bandwidth connections, while the cluster monitoring system can transmit a relevant subset of this information to a client device 206-1 via a lower-bandwidth connection (e.g., through a wireless network). As an illustrative example, the ingress interface 212 acts as a proxy (e.g., a smart proxy) between a client device and one or more Kubernetes clusters associated with the cluster monitoring system. In some embodiments, the ingress interface 212 can authenticate users or client devices based on requesting or receiving credential information and validating such information.

For example, the ingress interface 212 accepts a query from a client device for information relating to one or more Kubernetes clusters associated with the cluster monitoring system. For example, such information can relate to resources, events, or other aspects of relevant clusters of the one or more Kubernetes clusters. For example, an event may include calculations, operations, updates, or interactions associated with a given Kubernetes cluster. As an illustrative example, an event may include activation of a worker node or an update to a control plane node within a given Kubernetes cluster. In some implementations, API calls associated with a Kubernetes cluster enable the cluster monitoring system to obtain information relating to such events (e.g., through a dynamic stream or watch function), resources, or other information relating to the clusters through API calls. In response to the query, the ingress interface 212 can query the cluster interfaces 210 for this requested information associated with the relevant clusters. The ingress interface 212 can filter the information based on the information requested by the client device and transmit this subset of information to the client device, thereby satisfying the client device query. As an illustrative example, the ingress interface 212 can provide a dynamic data stream of events, objects, or other attributes of Kubernetes clusters from the associated cluster interfaces 210, where the cluster interfaces 210 convert Kubernetes-specific watches (e.g., watch functions) to another format (e.g., associated with a GraphQL schema) that is compatible with the ingress interface 212.

In some implementations, the query can request updates to or deletion of information within the one or more Kubernetes clusters. For example, the ingress interface 212 accepts a request to modify or delete information associated with a cluster interface. The ingress interface 212 can authenticate the user (e.g., via user credentials). In response to this authentication, the ingress interface 212 can provide the modification or deletion request to the respective cluster interfaces 210 to translate these requests to a cluster-readable format. As such, the cluster monitoring system can cause a suitable modification or deletion within the associated clusters, based on the client device's modification or deletion request. Accordingly, the cluster monitoring system enables the writing or modification of data associated with clusters in a scalable, flexible manner.

Figure 3:
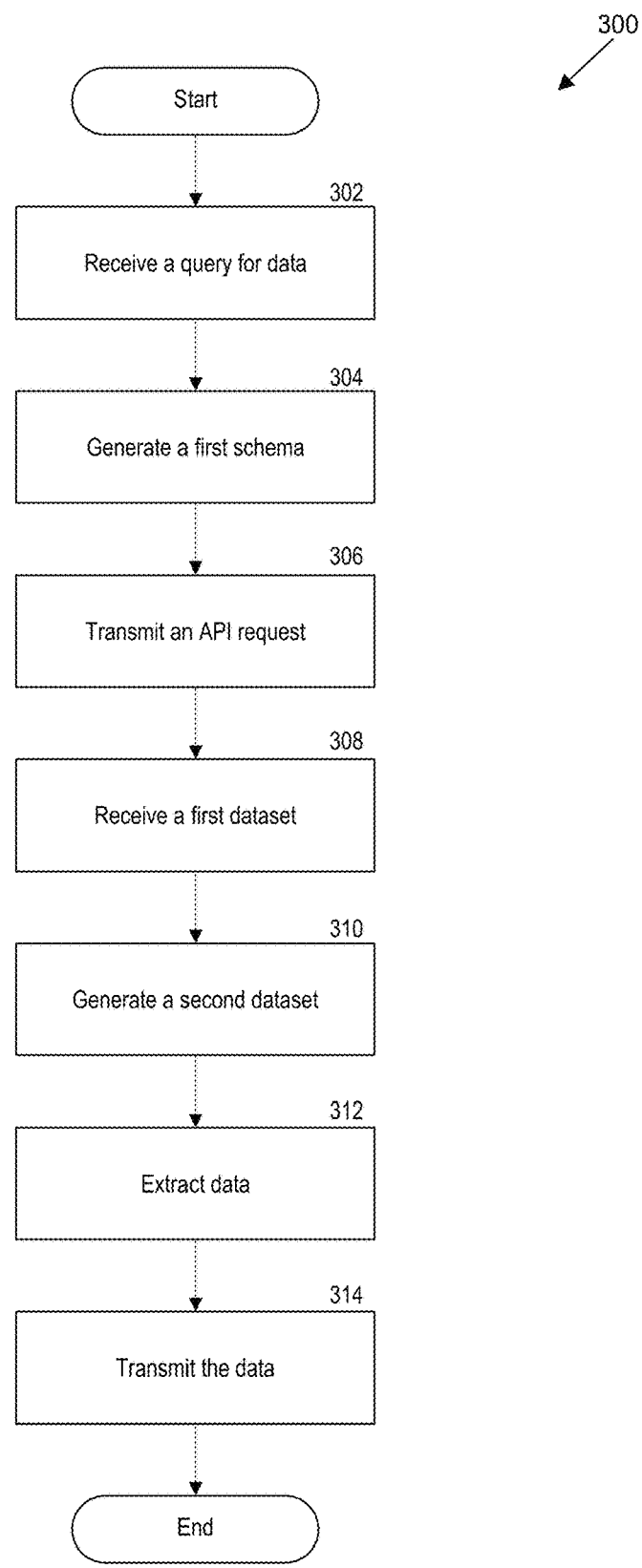
FIG. 3 is a flowchart illustrating a process for monitoring real-time data from a Kubernetes cluster at a client device.

FIG. 3 is a flowchart 300 illustrating a process for monitoring real-time data from a Kubernetes cluster at a client device. For example, the cluster monitoring system can utilize the process to transmit, to client devices, data relating to various Kubernetes clusters dynamically, even if such data is heterogeneous across the various Kubernetes clusters.

At operation 302, the cluster monitoring system can receive a query for data (e.g., at an ingress interface 212). For example, the cluster monitoring system can receive, from the client device via the network interface, a query for a dynamic stream of real-time data associated with the one or more clusters, where the real-time data includes information associated with resources of the one or more clusters. As an illustrative example, the system can receive a query for data associated with many Kubernetes clusters associated with the cluster monitoring system, such as a query for a real-time stream of updates associated with the clusters (e.g., objects that are modified, added, or deleted). By receiving such a query, the cluster monitoring system enables transmission of information associated with different clusters to client devices, as requested.

At operation 304, the cluster monitoring system (e.g., through a cluster interface) can generate a schema for a cluster. For example, the cluster monitoring system generates, for a first cluster of the one or more clusters, a first schema. In some implementations, the first schema includes a first protocol for representing, in a second format, information associated with the first cluster. In some implementations, the information associated with the first cluster is of a first format, where the first format is in accordance with a first API specification associated with a first application programming interface (API) of the first cluster. As an illustrative example, the cluster monitoring system can generate a schema that enables translation between a Kubernetes-specific API specification to a second API format, thereby enabling further conversion of data associated with the first API to a uniform or easily analyzable format.

In some implementations, the cluster monitoring system can generate an updated schema based on an updated API specification associated with the first cluster. For example, the cluster monitoring system receives, using the first API via the first communication path, an updated API specification associated with the first cluster, where the updated API specification includes metadata associated with an update to the first format. The cluster monitoring system can update the first schema based on the updated API specification. As an illustrative example, the API specification associated with the first cluster can change due to an addition of a feature. As such, the cluster monitoring system can adapt to such changes by generating a new schema to enable translation from the first format to the second format.

In some implementations, the cluster monitoring system can determine that the new feature includes a database with associated database metadata. For example, the cluster monitoring system can determine that the updated API specification associated with the first cluster includes database metadata associated with a database extension for the first API. The cluster monitoring system can update the first schema based on determining that the updated API specification includes the database metadata. The first schema can include a representation of the database metadata in the second format. As an illustrative example, the cluster monitoring system can generate an updated schema that includes metadata relating to the database, including an associated language, associated API calls, and other related information, thereby enabling translation of database-related data to the second format at the cluster interface.

In some implementations, the cluster monitoring system can detect creation of a new cluster and generate a schema accordingly. For example, the cluster monitoring system receives a cluster addition notification. The cluster addition notification can indicate an initiation of a second cluster of the one or more clusters and an endpoint for a second API associated with the second cluster. Based on receiving the cluster addition notification, the cluster monitoring system can generate a second schema, wherein the second schema includes a second protocol for representing, in the second format, information of a third format. The third format can include a second API specification associated with the second API. The cluster monitoring system can transmit data, based on the second schema, associated with the second cluster to the client device via the network interface. For example, the cluster monitoring system enables transmission of data to the client device based on detection of a cluster added to the network, thereby enabling dynamic generation of cluster schema without system administrator intervention.

In some implementations, the cluster monitoring system can generate a schema based on a watch function associated with a Kubernetes cluster. For example, the cluster monitoring system can determine that the first API specification includes a first watch function, wherein the first watch function includes a first resource for dynamically tracking events associated with the first cluster, and wherein the events associated with the first cluster are of the first format. The cluster monitoring system can generate a translation layer for conversion of dynamic streams of real-time data of the first watch function to dynamic streams of real-time data of the second format. The cluster monitoring system can generate the first schema, where the first schema includes the translation layer. As an illustrative example, the cluster monitoring system can generate the schema to capture a Kubernetes-specific API call, such as a watch function that enables dynamic updates or information relating to events relating to the associated cluster. Based on this API call, such as one associated with the watch function, the cluster monitoring system can generate the schema such that data associated with these Kubernetes-specific API calls can be converted to a second format, compatible with or comparable to data associated with other clusters. The cluster monitoring system can accomplish this conversion through generation of an applicable translation layer, thereby enabling dynamic updates associated with Kubernetes clusters in a more flexible format, such as an open-source format.

At operation 306, the cluster monitoring system (e.g., a cluster interface) can transmit an API request. For example, the cluster monitoring system can transmit, using the first API via a first communication path of the one or more communication paths, an API request for a dynamic stream of real-time data associated with the first cluster. As an illustrative example, the cluster monitoring system, through the cluster interface, can determine an API endpoint associated with the first API that is capable of generating information requested from the client device (e.g., a data stream). The cluster interface can call this endpoint associated with a given cluster for transmission of requested information. By doing so, the cluster interface can receive cluster-specific information for subsequent processing and transmission to the client device.

At operation 308, the cluster monitoring system (e.g., a cluster interface) can receive a first dataset. For example, in response to the API request, the cluster monitoring system can receive a first dataset associated with the first cluster, where the first dataset is of the first format. As an illustrative example, the cluster monitoring system, through the cluster interface, can receive information in response to the API call for further processing and transmission to the client devices. The client monitoring system can receive information associated with a variety of APIs associated with a variety of clusters, where each of this data may be of a different format. Thus, the cluster monitoring system enables compilation of data from multiple clusters (e.g., different Kubernetes clusters).

At operation 310, the cluster monitoring system (e.g., the cluster interface) can generate a second dataset. For example, the cluster monitoring system can, based on the first schema and the first dataset, generate a second dataset, where the second dataset is of the second format. For example, the cluster monitoring system can generate a dataset that is of an easily analyzable or easy-to-parse format (e.g., a particular data-serialization file format), such that datasets of different clusters can be converted into analogous formats for subsequent compilation and/or extraction of requested data.

In some implementations, the cluster monitoring system (e.g., the cluster interface) can generate the second dataset to include a dynamic stream of data translated into the second format. For example, the cluster monitoring system can determine, based on the first dataset, a first dynamic stream of real-time data from the first watch function, where the first dynamic stream of real-time data is associated with the first format. The cluster monitoring system can generate, via the translation layer, a second dynamic stream of real-time data, where the second dynamic stream of real-time data is associated with the second format. The cluster monitoring system can generate the second dataset, wherein the second dataset includes the second dynamic stream of real-time data. As an illustrative example, the cluster monitoring system can generate, within the second dataset, a stream of data associated with a given Kubernetes cluster, where the stream provides information relating to events associated with the cluster. Such information may be in a second data format that is consistent across clusters associated with the system, thereby enabling compilation of data from clusters with disparate or distinct API specifications. For example, the cluster monitoring system can generate this second dataset utilizing the translation layer associated with the schema, thereby enabling efficient, consistent conversion of Kubernetes cluster-specific data to a second, uniform format for relaying to client devices.

At operation 312, the cluster monitoring system (e.g., through the ingress interface 212) can extract data for transmission to the client device. For example, the cluster monitoring system, based on filtering the second dataset, extracts a first data stream associated with the first cluster. As an illustrative example, the cluster monitoring system can determine information relevant to the query for the dynamic stream of real-time data based on the second dataset and filter out additional unrelated information. By doing so, the cluster monitoring system improves scalability by reducing information subsequently transmitted to the client device.

In some embodiments, the cluster monitoring system can filter and extract data associated with clusters based on a mapping associated with the schema. For example, the cluster monitoring system determines a data stream mapping based on the first schema for the first cluster. The cluster monitoring system can extract the first data stream based on the data stream mapping. As an illustrative example, the cluster monitoring system can determine a field associated with a real-time data stream (or other data of a specified type) within the second dataset based on an indication of an associated field within the first schema and extract this information from an associated portion of the second dataset. By doing so, the cluster monitoring system enables efficient filtering of required information for transmission to the client device.

At operation 314, the cluster monitoring system (e.g., through the ingress interface 212) can transmit the data to the client device. For example, in response to the query for the dynamic stream of real-time data, the cluster monitoring system transmits, to the client device via the network interface, the first data stream. As an illustrative example, the cluster monitoring system can dynamically transmit and update requested streams of information from Kubernetes clusters, even if such streams are in different formats associated with different clusters. The client device can receive this information without reference or metadata relating to individual clusters to be queried, thereby improving the scalability of the cluster monitoring system.

In some embodiments, the cluster monitoring system can require authentication prior to transmission of data to the client device. For example, the cluster monitoring system transmits an authentication request to the client device via the network interface. In response to the authentication request, the cluster monitoring system receives device credentials from the client device via the network interface. Based on the device credentials, the cluster monitoring system can generate a validation status for the client device. Based on the validation status, the cluster monitoring system can determine to transmit the first data stream to the client device via the network interface.

Computer System

Figure 4:
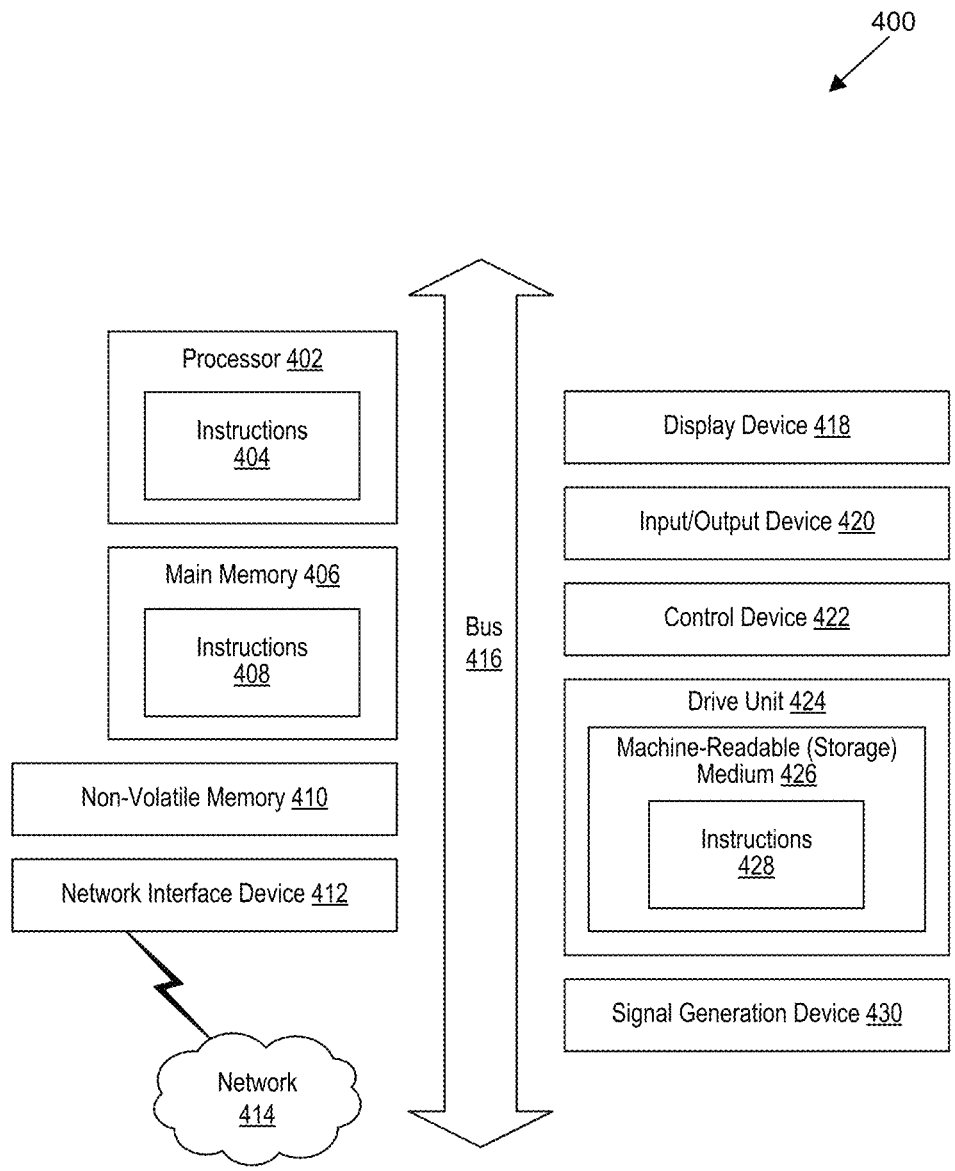
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a video display device 418, an input/output device 420, a control device 422 (e.g., keyboard and pointing device), a drive unit 424 that includes a machine-readable (storage) medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementations, the computer system 400 can be an embedded computer system, a system-on-chip (SOC), a single-board computer system (SBC), or a distributed system such as a mesh of computer systems, or it can include one or more cloud components in one or more networks. Where appropriate, one or more computer systems 400 can perform operations in real time, in near real time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system comprising:
    at least one hardware processor;
    one or more communication paths configured to enable communication with one or more clusters of real or virtual computing devices; and
    at least one non-transitory memory storing instructions, which, when executed by the at least one hardware processor, cause the system to:
        receive, from a client device, a query for a dynamic stream of real-time data,
            wherein the real-time data includes information associated with the one or more clusters;
        generate, for a first cluster of the one or more clusters, a first schema,
            wherein the first schema comprises a first protocol for representing, in a second format, information relating to the first cluster,
            wherein the information relating to the first cluster is of a first format in accordance with a first application programming interface (API) specification associated with a first API of the first cluster,
            wherein the first format comprises a Kubernetes-specific API format,
            wherein the second format comprises a cluster interface-specific format, and
            wherein the first protocol includes a translation layer comprising a key-value pair mapping for converting data of the Kubernetes-specific API format to data of the cluster interface-specific format;
        transmit, using the first API via a first communication path of the one or more communication paths, an API request for a dynamic stream of real-time data associated with the first cluster;
        in response to the API request, receive a first dataset that is of the first format and is associated with the first cluster;
        based on the first dataset and using the first protocol of the first schema including the key-value pair mapping of the translation layer, generate a second dataset of the second format;

extract, from the second dataset, a first data stream using the key-value pair mapping; and in response to the query for the dynamic stream of real-time data, transmit, to the client device, the first data stream.

2. The system of claim 1, wherein the instructions cause the system to:

receive, using the first API via the first communication path, an updated API specification associated with the first cluster, wherein the updated API specification includes metadata associated with an update to the first format; and update the first schema based on the updated API specification.

3. The system of claim 2, wherein the instructions for updating the first schema based on the updated API specification cause the system to:

determine that the updated API specification associated with the first cluster includes database metadata associated with a database extension for the first API; and update the first schema based on determining that the updated API specification includes the database metadata, wherein the first schema includes a representation of the database metadata in the second format.

4. The system of claim 1, wherein the instructions cause the system to:

receive a cluster addition notification, wherein the cluster addition notification indicates an initiation, of a second cluster of the one or more clusters, and an endpoint for a second API associated with the second cluster;

based on receiving the cluster addition notification, generate a second schema, wherein the second schema comprises a second protocol for representing, in the second format, information of a third format, and wherein the third format comprises a second API specification associated with the second API; and transmit data, based on the second schema, associated with the second cluster to the client device via a network interface.

5. The system of claim 1, wherein the instructions for extracting the first data stream cause the system to:

determine a data stream mapping based on the first schema for the first cluster; and extract the first data stream based on the data stream mapping.

6. The system of claim 5, wherein the instructions for extracting the first data stream cause the system to:

determine, based on the first schema, an indication of a field associated with a real-time data stream;

determine, based on the indication of the field, an associated portion of the second dataset; and extract the first data stream from the associated portion of the second dataset.

7. The system of claim 1, wherein the instructions cause the system to:

transmit an authentication request to the client device via a network interface;

in response to the authentication request, receive device credentials from the client device via the network interface;

based on the device credentials, generate a validation status for the client device; and based on the validation status, determine to transmit the first data stream to the client device via the network interface.

8. At least one non-transitory, computer-readable storage medium comprising instructions recorded thereon, wherein the instructions, when executed by at least one data processor of a system, cause the system to:

receive, from a client device, a query for information associated with one or more clusters of real or virtual computing devices, wherein the information is associated with resources of the one or more clusters;

generate, for a first cluster of the one or more clusters, a first schema, wherein the first schema comprises a first protocol for representing, in a second format, information associated with the first cluster, wherein the information associated with the first cluster is of a first format, wherein the first format is in accordance with a first API specification associated with a first API of the first cluster, wherein the first format comprises a Kubernetes-specific API format, wherein the second format comprises a cluster interface-specific format, and wherein the first protocol includes a translation layer comprising a key-value pair mapping for converting data of the Kubernetes-specific API format to data of the cluster interface-specific format;

transmit, using the first API, an API request for resource data associated with the first cluster;

in response to the API request, receive a first dataset associated with the first cluster, wherein the first dataset is of the first format;

based on the first dataset and using the first protocol of the first schema including the key-value pair mapping of the translation layer generate a second dataset, wherein the second dataset is of the second format;

based on filtering the second dataset and using the key-value pair mapping, extract first data associated with the first cluster; and in response to the query for the information, transmit, to the client device, the first data.

9. The at least one non-transitory, computer-readable storage medium of claim 8, wherein the instructions cause the system to:

receive, using the first API, an updated API specification associated with the first cluster, wherein the updated API specification includes metadata associated with an update to the first format; and update the first schema based on the updated API specification.

10. The at least one non-transitory, computer-readable storage medium of claim 9, wherein the instructions for updating the first schema based on the updated API specification cause the system to:

determine that the updated API specification associated with the first cluster includes database metadata associated with a database extension for the first API; and update the first schema based on determining that the updated API specification includes the database metadata, wherein the first schema includes a representation of the database metadata in the second format.

11. The at least one non-transitory, computer-readable storage medium of claim 8, wherein the instructions cause the system to:
receive a cluster addition notification,
wherein the cluster addition notification indicates an initiation, of a second cluster of the one or more clusters, and an endpoint for a second API associated with the second cluster;
based on receiving the cluster addition notification, generate a second schema,
wherein the second schema comprises a second protocol for representing, in the second format, information of a third format, and
wherein the third format comprises a second API specification associated with the second API; and
transmit data, based on the second schema, associated with the second cluster to the client device.

12. The at least one non-transitory, computer-readable storage medium of claim 8, wherein the instructions for extracting the first data cause the system to:
determine a data type mapping based on the first schema for the first cluster; and
extract the first data based on the data type mapping.

13. The at least one non-transitory, computer-readable storage medium of claim 12, wherein the instructions for extracting the first data cause the system to:
determine, based on the first schema, an indication of a field associated with data of a first type;
determine, based on the indication of the field, an associated portion of the second dataset; and
extract the first data from the associated portion of the second dataset.

14. The at least one non-transitory, computer-readable storage medium of claim 8, wherein the instructions cause the system to:
transmit an authentication request to the client device;
in response to the authentication request, receive device credentials from the client device;
based on the device credentials, generate a validation status for the client device; and
based on the validation status, determine to transmit the first data to the client device.

15. The at least one non-transitory, computer-readable storage medium of claim 8, wherein the instructions for generating the first schema cause the system to:
determine that the first API specification includes a first watch function,
wherein the first watch function comprises a first resource for dynamically tracking events associated with the first cluster, and
wherein the events associated with the first cluster are of the first format;
generate a translation layer for conversion of dynamic streams of real-time data of the first watch function to dynamic streams of real-time data of the second format; and
generate the first schema,
wherein the first schema comprises the translation layer.

16. The at least one non-transitory, computer-readable storage medium of claim 15, wherein the instructions for generating the second dataset cause the system to:
determine, based on the first dataset, a first dynamic stream of real-time data from the first watch function, wherein the first dynamic stream of real-time data is associated with the first format;
generate, via the translation layer, a second dynamic stream of real-time data,
wherein the second dynamic stream of real-time data is associated with the second format; and
generate the second dataset,
wherein the second dataset includes the second dynamic stream of real-time data.

17. A method comprising:
receiving, from a client device, a query for information associated with one or more clusters of real or virtual computing devices,
wherein the information is associated with resources of the one or more clusters;
generating, for a first cluster of the one or more clusters, a first schema,
wherein the first schema comprises a first protocol for representing, in a second format, information associated with the first cluster,
wherein the information associated with the first cluster is of a first format,
wherein the first format is in accordance with a first API specification associated with a first API of the first cluster,
wherein the first format comprises a Kubernetes-specific API format,
wherein the second format comprises a cluster interface-specific format, and
wherein the first protocol includes a translation layer comprising a key-value pair mapping for converting data of the Kubernetes-specific API format to data of the cluster interface-specific format;
transmitting, using the first API, an API request for resource data associated with the first cluster;
in response to the API request, receiving a first dataset associated with the first cluster,
wherein the first dataset is of the first format;
based on the first dataset and using the first protocol of the first schema including the key-value pair mapping of the translation layer,
generating a second dataset,
wherein the second dataset is of the second format;
based on filtering the second dataset and using the key-value pair mapping, extracting first data associated with the first cluster; and
in response to the query for the information, transmitting, to the client device, the first data.

18. The method of claim 17, comprising:
receiving, using the first API, an updated API specification associated with the first cluster,
wherein the updated API specification includes metadata associated with an update to the first format; and
updating the first schema based on the updated API specification.

19. The method of claim 18, wherein updating the first schema based on the updated API specification comprises:
determining that the updated API specification associated with the first cluster includes database metadata associated with a database extension for the first API; and
updating the first schema based on determining that the updated API specification includes the database metadata,
wherein the first schema includes a representation of the database metadata in the second format.

20. The method of claim 17, comprising:
receiving a cluster addition notification, wherein the cluster addition notification indicates an initiation, of a second cluster of the one or more clusters, and an endpoint for a second API associated with the second cluster;

based on receiving the cluster addition notification, generating a second schema,
  wherein the second schema comprises a second protocol for representing, in the second format, information of a third format, and
  wherein the third format comprises a second API specification associated with the second API; and transmitting data, based on the second schema, associated with the second cluster to the client device.

* * * * *